(12) United States Patent
Landes et al.

(10) Patent No.: US 7,243,429 B2
(45) Date of Patent: Jul. 17, 2007

(54) WIRE STRIPPER SYSTEMS

(76) Inventors: Mark J. Landes, Sednal Consulting 9404 Pond Rd. North, Bemidji, MN (US) 56601; James M. Landes, Sednal Consulting 9404 Pond Rd. North, Bemidji, MN (US) 56601

( * ) Notice: Subject to any disclaimer, the term of this patent is extended or adjusted under 35 U.S.C. 154(b) by 0 days.

(21) Appl. No.: 11/277,209

(22) Filed: Mar. 22, 2006

(65) Prior Publication Data
US 2006/0242839 A1 Nov. 2, 2006

Related U.S. Application Data

(60) Provisional application No. 60/665,059, filed on Mar. 23, 2005.

(51) Int. Cl.
*H02G 1/12* (2006.01)

(52) U.S. Cl. .................. 30/90.4; 30/90.1; 81/9.44

(58) Field of Classification Search ............ 30/90.1, 30/90.2, 90.4, 90.8, 90.6; 81/9.4, 9.44
See application file for complete search history.

(56) References Cited

U.S. PATENT DOCUMENTS

| 4,111,076 | A | | 9/1978 | Rocha et al. | |
|---|---|---|---|---|---|
| 4,117,749 | A | * | 10/1978 | Economu | 30/90.6 |
| 4,368,654 | A | * | 1/1983 | Kober et al. | 30/90.1 |
| 4,543,717 | A | | 10/1985 | Luka | |
| 4,557,163 | A | | 12/1985 | Tanner | |
| 4,858,315 | A | * | 8/1989 | Tanner | 30/90.4 |
| 5,050,302 | A | | 9/1991 | Mills | |
| 5,582,078 | A | | 12/1996 | Talley | |
| 5,745,996 | A | * | 5/1998 | Kenny et al. | 30/90.1 |
| 5,950,505 | A | | 9/1999 | Locher | |
| 6,381,850 | B1 | | 5/2002 | Warner | |
| 6,442,833 | B1 | | 9/2002 | Mizuno et al. | |
| 6,467,171 | B2 | | 10/2002 | Tarpill | |
| 6,505,399 | B2 | | 1/2003 | Lo et al. | |

* cited by examiner

*Primary Examiner*—Hwei-Siu Payer
(74) *Attorney, Agent, or Firm*—Stoneman Volk Patent Group; Martin L. Stoneman

(57) ABSTRACT

A hand-held system adapted to assist stripping of an undulating outer jacket of a twisted pair wire. The system incorporates cutters to provide two longitudinal cuts through the outer jacket of the twisted shielded pair wire. The cutters are removable and replaceable.

10 Claims, 8 Drawing Sheets

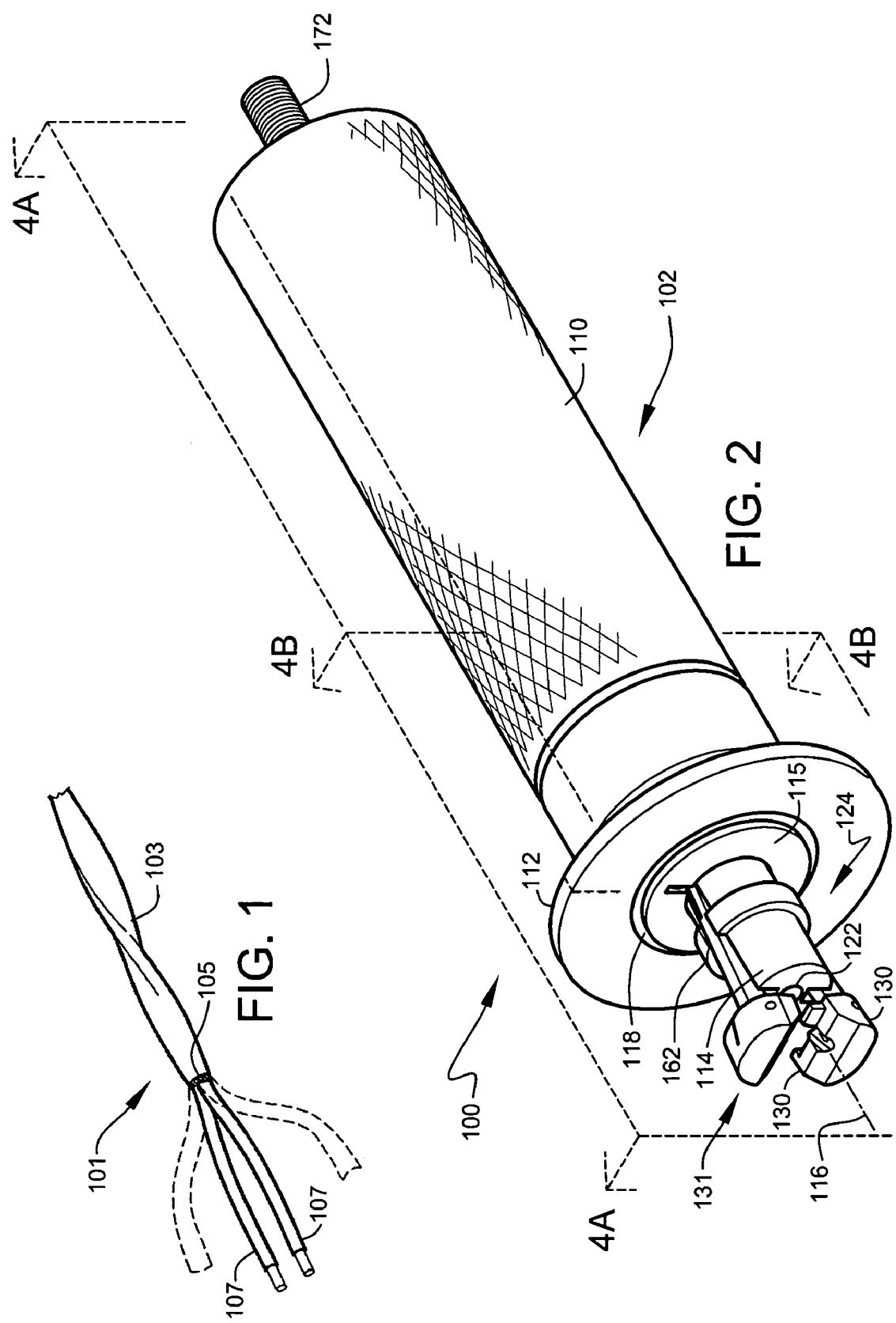

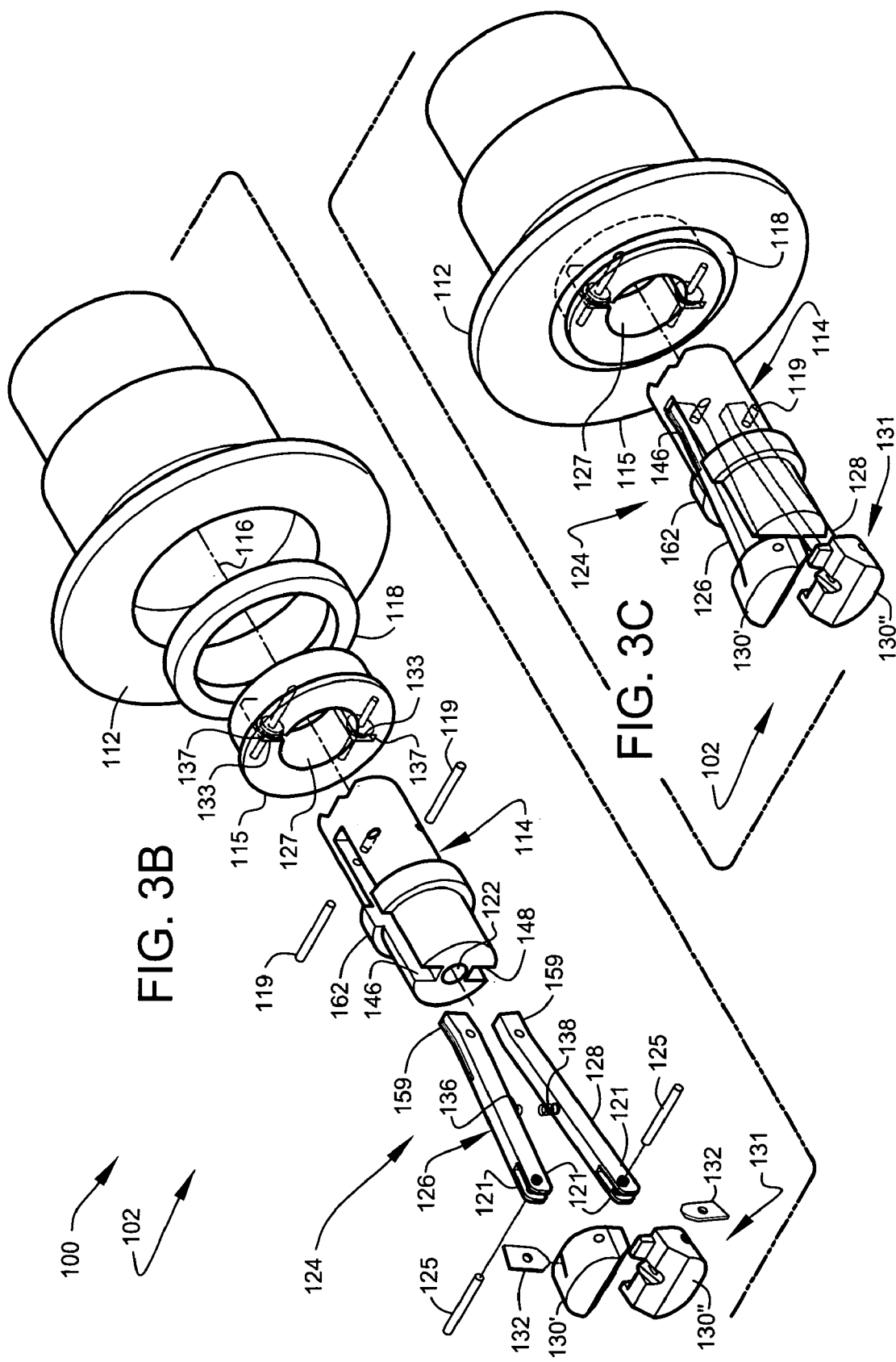

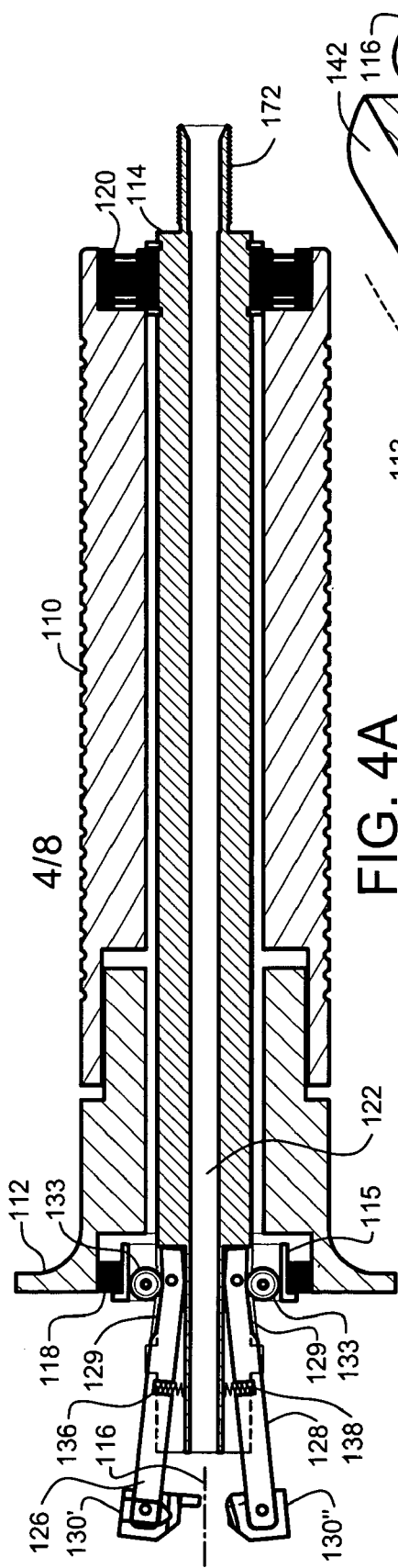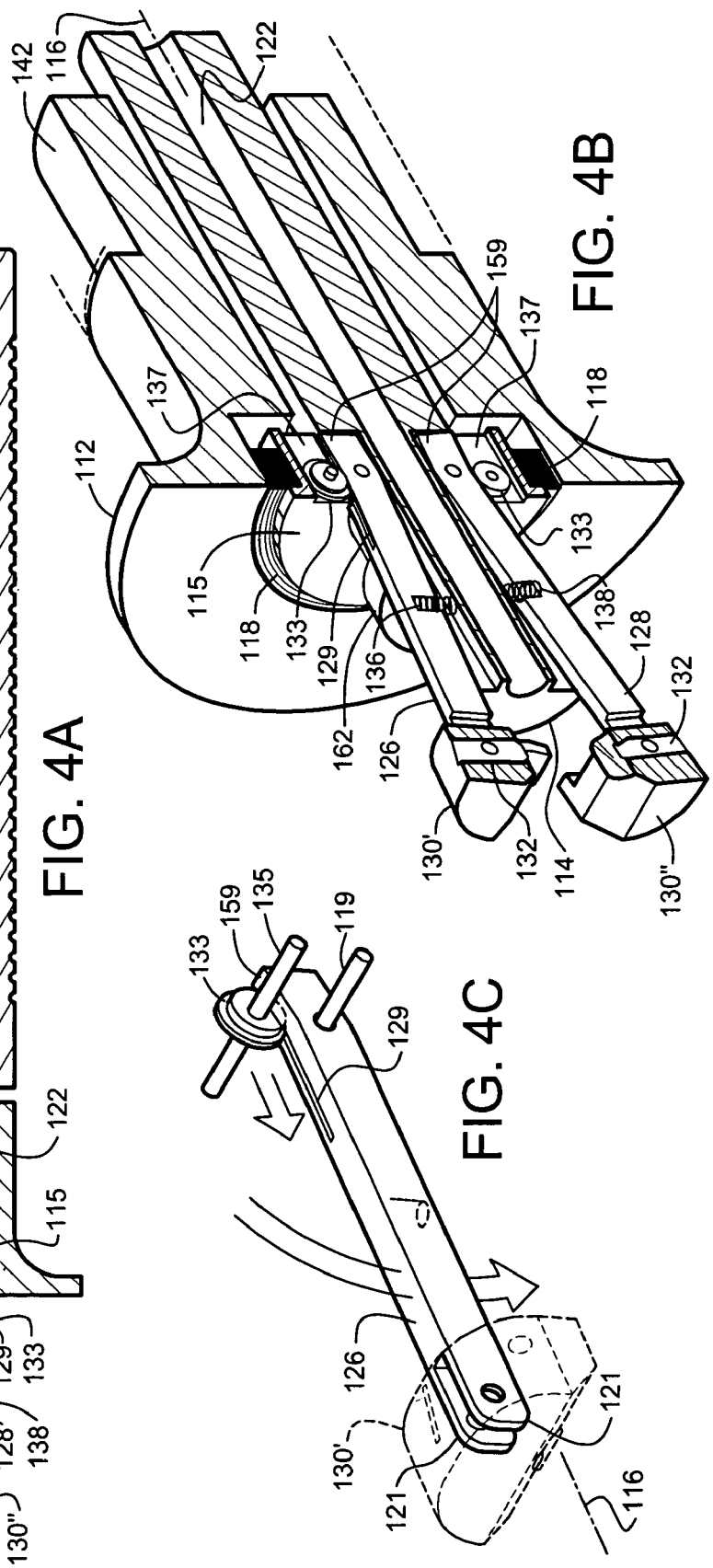

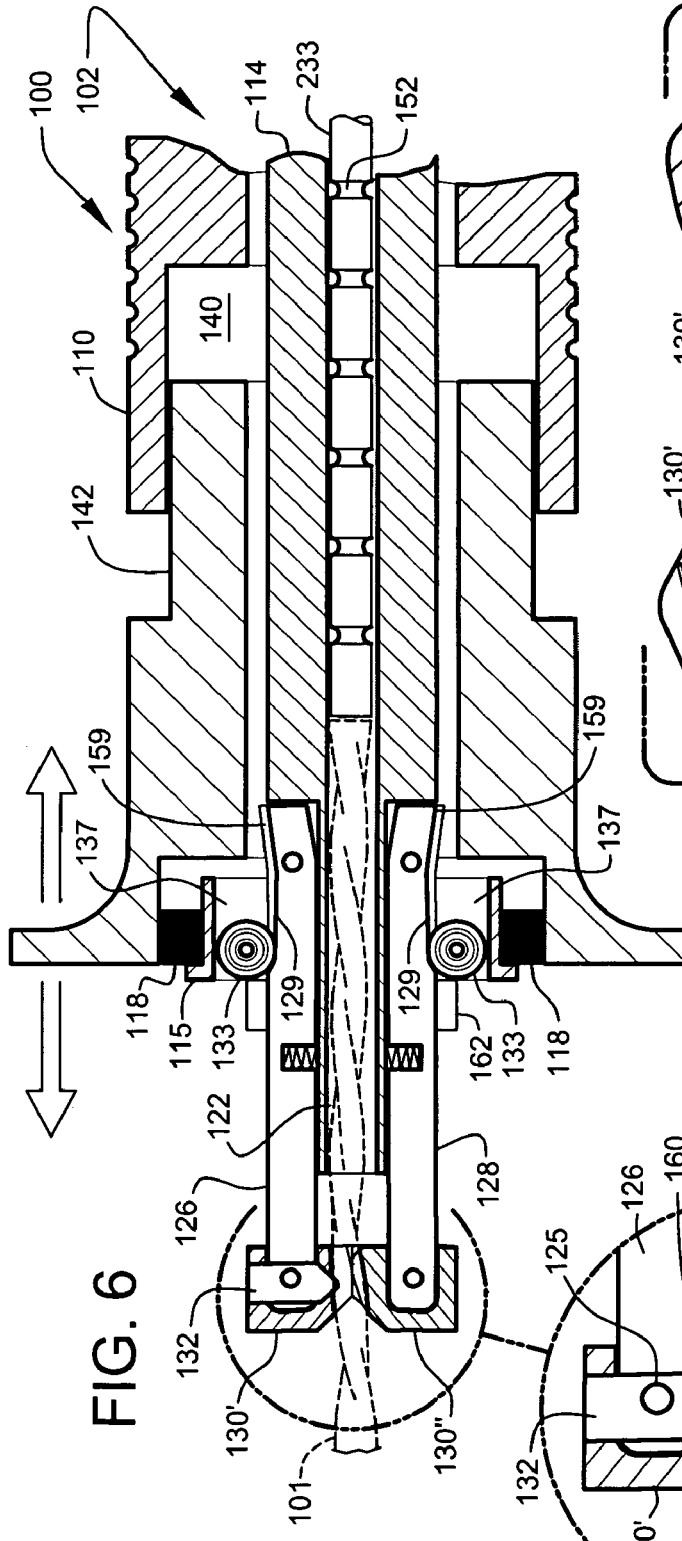

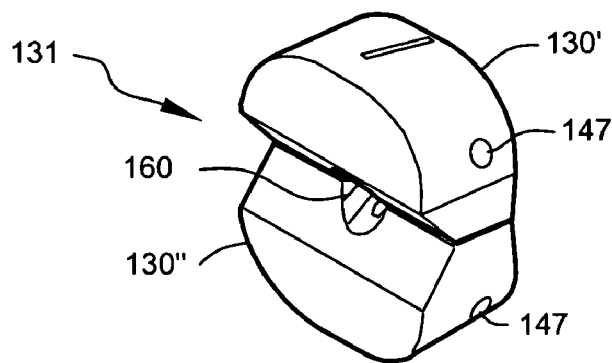
FIG. 8
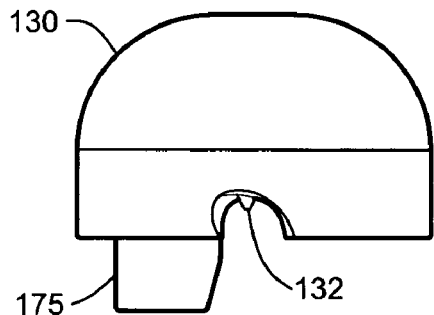
FIG. 9
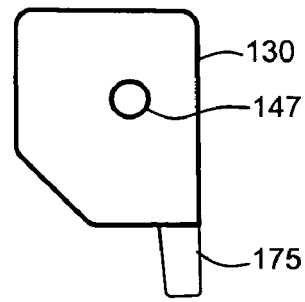
FIG. 12
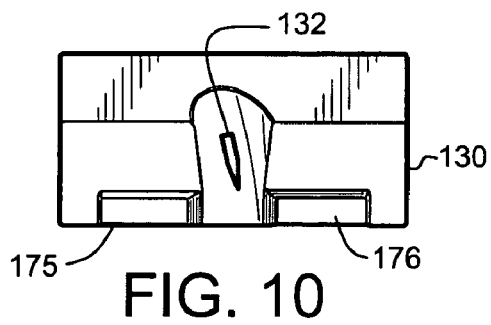
FIG. 10
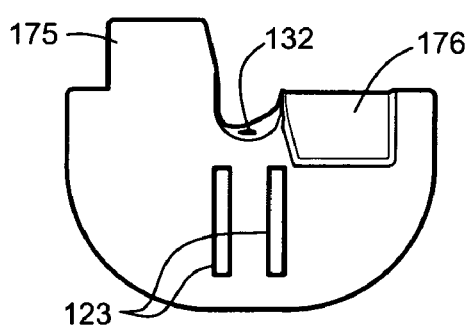
FIG. 11
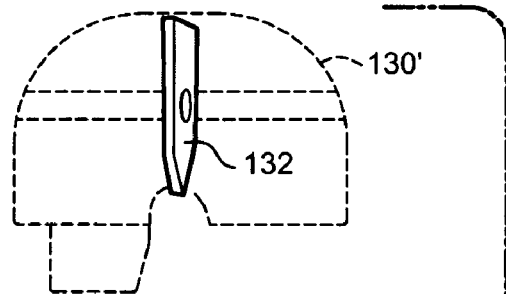
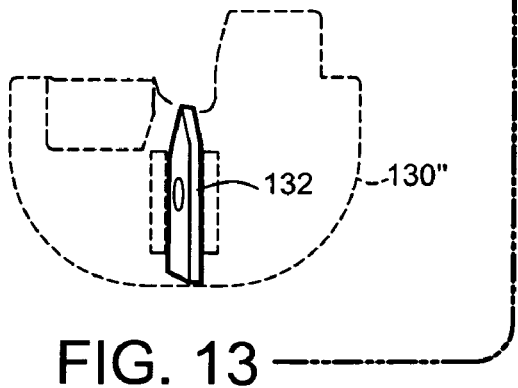
FIG. 13

WIRE STRIPPER SYSTEMS

The present application is related to and claims priority from prior provisional application Ser. No. 60/665,059 filed Mar. 23, 2005, entitled "WIRE STRIPPER SYSTEMS", the content of which is incorporated herein by this reference and is not admitted to be prior art with respect to the present invention by the mention in this cross-reference section.

BACKGROUND

This invention relates to providing a system for improved wire stripper systems. More particularly this invention relates to providing a system relating to the stripping of an undulating outer jacket of a twisted wire, especially twisted pair wire.

Twisted wire (such as Mil-Spec twisted shielded pair wire) is presently used in nearly every new aircraft avionics installation. Present techniques to properly strip and prepare the wire ends, for attachment to the electronics systems, are difficult and inefficient.

The difficulty in stripping twisted shielded wire arises from the non-uniformity of the shaped outer jacket. Presently, a razor blade is used to create a longitudinal slice through the outer jacket along the length of the portion of jacket to be removed. The outer jacket is then peeled away from the inner structure, and is removed with snips or by performing a circumferential cut with the razor blade. This technique is inexact, cumbersome and time consuming.

OBJECTS AND FEATURES OF THE INVENTION

A primary object and feature of the present invention is to provide a system to overcome the above-mentioned problems.

Another object and feature of the present invention is to provide a hand-held system adapted to assist stripping of an undulating outer jacket of a twisted wire such as a twisted pair wire.

Another object and feature of the present invention is to provide a system incorporating cutting means for providing at least one longitudinal cut through the outer jacket of the twisted shielded wire.

It is a further object and feature of the present invention to provide such a system that is manually actuated without the need for electrical motivation or control.

Another object and feature of the present invention is to provide a system incorporating multiple dies forming a specially shaped aperture for receiving twisted shielded wire.

It is a further object and feature of the present invention to provide such a system wherein the cutting means for cutting the outer sleeve is user replaceable/renewable.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system relating to the stripping of at least one outer jacket from at least one twisted wire comprising: receiver means for receiving at least one portion of the at least one twisted wire; and rotator means for permitting rotation of such receiver means relative to the at least one twisted wire; wherein such receiver means comprises first cutter means for producing at least one first longitudinal cut through the at least one outer jacket, second cutter means for producing at least one second longitudinal cut through the at least one outer jacket, and positioner means for positioning of such first cutter means and such second cutter means adjacent the at least one outer jacket to permit such at least one first longitudinal cut and such at least one second longitudinal cut.

Moreover, it provides such a system further comprising grip means for assisting user griping of such receiver means. Additionally, it provides such a system further comprising manual actuator means for permitting manual actuation of such positioner means. Also, it provides such a system further comprising cut length gauge means for gauging at least one length of at least one of such at least one first longitudinal cut and such at least one second longitudinal cut. In addition, it provides such a system wherein: such first cutter means is useable as such second cutter means; and such second cutter means is usable as such first cutter means. And, it provides such a system wherein: such first cutter means and such second cutter means each comprise removable coupler means for permitting removable coupling to such receiver means; and such first cutter means and such second cutter means are user replaceable after at least one use.

In accordance with another preferred embodiment hereof, this invention provides a system, relating to the stripping of at least one outer jacket from at least one twisted wire having at least one outer peripheral shape, comprising: receiver means for receiving at least one portion of the at least one twisted wire; and rotator means for permitting rotation of such receiver means relative to the at least one twisted wire; wherein such receiver means comprises cutter means for producing at least one longitudinal cut through the at least one outer jacket, positioner means for positioning of such cutter means adjacent the at least one outer jacket to permit such at least one longitudinal cut, and shape conformer means for shape conforming to the at least one outer peripheral shape of such at least one twisted wire during the production of such at least one longitudinal cut.

In accordance with a preferred embodiment hereof, this invention provides a system, relating to the stripping of at least one outer jacket from at least one wire having at least one irregular outer peripheral shape, such system comprising: at least one receiver adapted to receive at least one portion of the at least one wire; and at least one rotator adapted to assist rotation of such at least one receiver relative to the at least one wire; wherein such at least one receiver comprises at least one first cutter adapted to produce at least one first longitudinal cut through the at least one outer jacket, at least one positioner adapted to position such at least one cutter adjacent the at least one outer jacket to assist in generating such at least one longitudinal cut, and at least one shape conformer adapted to conform to the at least one irregular outer peripheral shape of such at least one wire during the generation of such at least one longitudinal cut.

Moreover, it provides such a system wherein: such at least one receiver comprises at least one channel adapted to pass the at least one wire; such at least one shape conformer comprises at least one irregular inner peripheral shape within such at least one channel; and such at least one irregular inner peripheral shape substantially matches such at least one irregular outer peripheral shape. Additionally, it provides such a system wherein: such at least one channel comprises such at least one first cutter; and such at least one channel further comprises at least one second cutter adapted to produce at least one second longitudinal cut through the at least one outer jacket. Also, it provides such a system wherein: such at least one first cutter and such at least one second cutter rotates with such at least one receiver during operation; and such at least one first cutter and such at least one second cutter operate essentially contemporaneously. In addition, it provides such a system further comprising: at least one hand-holdable housing adapted to house such at least one rotator and such at least one receiver.

In accordance with another preferred embodiment hereof, this invention provides a system, relating to the stripping of at least one outer jacket from at least one wire having at least one irregular outer peripheral shape, comprising: at least one receiver adapted to receive at least one portion of the at least one wire; and at least one rotator adapted to assist rotation of such at least one receiver relative to the at least one wire; wherein such at least one receiver comprises at least one first cutter adapted to produce at least one first longitudinal cut through the at least one outer jacket, at least one second cutter adapted to produce at least one second longitudinal cut through the at least one outer jacket, and at least one positioner adapted to position such at least one first cutter and such at least one second cutter adjacent the at least one outer jacket to assist in generating such at least one first longitudinal cut and such at least one second longitudinal cut.

And, it provides such a system further comprising at least one hand-holdable housing adapted to house such at least one rotator and such at least one receiver. Further, it provides such a system wherein such at least one positioner comprises: coupled to such at least one receiver, at least one first pivot member adapted to pivotally engage such at least one first cutter with the at least one outer jacket; coupled to such at least one receiver, at least one second pivot member adapted to pivotally engage such at least one second cutter with the at least one outer jacket; and at least one manual actuator adapted to assist manual actuation of such at least one first pivot member and such at least one second pivot member.

Even further, it provides such a system further comprising at least one cut length gauge adapted to gauge at least one length of at least one of such at least one first longitudinal cut and such at least one second longitudinal cut. Moreover, it provides such a system wherein: such at least one first cutter is useable as such at least one second cutter; and such at least one second cutter is usable as such at least one first cutter. Additionally, it provides such a system wherein such at least one first cutter and such at least one second cutter each comprise at least one removable coupler to assist removable coupling with such at least one receiver.

Also, it provides such a system wherein: such at least one first cutter comprises at least one first cutting die adapted to engage at least one first portion of the at least one outer jacket; such at least one second cutter comprises at least one second cutting die adapted to engage at least one second portion of the at least one outer jacket; and such at least one first cutting die and such at least one second cutting die each comprise at least one cutting blade. In addition, it provides such a system wherein: such at least one first cutting die and such at least one second cutting die together comprise at least one shaped channel adapted to pass the at least one wire; such at least one shaped channel comprises at least one irregular inner peripheral shape; and such at least one irregular inner peripheral shape substantially matches such at least one irregular outer peripheral shape of the at least one wire.

And, it provides such a system wherein such at least one first cutting die and such at least one second cutting die are substantially identical. Further, it provides such a system further comprising at least one lateral positioner adapted to laterally position such at least one first cutting die relative to such at least one second cutting die during use.

Even further, it provides such a system wherein: such at least one lateral positioner comprises at least one projecting tab and at least one recessed socket; such at least one projecting tab is adapted to engage such at least one recessed socket; and each one of such at least one first cutting die and such at least one second cutting die comprise such at least one projecting tab and such at least one recessed socket. Even further, it provides such a system wherein: each such at least one cutting blade is permanently embedded within a respective such at least one first cutting die and such at least one second cutting die.

Even further, it provides such a system wherein: such at least one receiver comprises at least one tubular member comprising at least one longitudinal axis and at least one hollow interior portion coaxial with such at least one longitudinal axis; such at least one hollow interior portion is adapted to accommodate the at least one portion of the at least one wire; such at least one rotator comprises at least one first rotatable bearing adapted to rotationally support such at least one tubular member and at least one second rotatable bearing adapted to rotationally support such at least one tubular member; and such at least one first rotatable bearing is movable relative to such at least one tubular member.

Furthermore, it provides such a system wherein such at least one manual actuator comprises such at least one first rotatable bearing. Even further, it provides such a system wherein such at least one first rotatable bearing comprises: at least one first friction reducer adapted to reduce friction between such at least one manual actuator and such at least one first pivot member; and at least one second friction reducer adapted to reduce friction between such at least one manual actuator and such at least one second pivot member. Even further, it provides such a system wherein: such at least one cut length gauge comprises at least one rod adapted to adapted to gauge at least one length of at least one of such at least one first longitudinal cut and such at least one second longitudinal cut, at least one collet nut adapted to adjustably retain such at least one rod within such at least one hollow interior portion; wherein such at least one tubular member comprises at least one threaded end adapted to threadably receive such at least one collet nut.

In accordance with another preferred embodiment hereof, this invention provides a system, relating to the stripping of at least one outer jacket from at least one twisted electrical wire having at least one twisted outer peripheral shape, comprising: at least one receiver adapted to receive at least one portion of the at least one twisted electrical wire; at least one rotator adapted to assist rotation of such at least one receiver relative to the at least one twisted electrical wire; and at least one hand-holdable housing adapted to house such at least one rotator and such at least one receiver; wherein such at least one receiver comprises at least one cutter adapted to generate at least one longitudinal cut through the at least one outer jacket, at least one positioner adapted to position such at least one cutter adjacent the at least one outer jacket to assist in generating such at least one longitudinal cut, and at least one shape conforming guide adapted to guide such at least one cutter along the at least one twisted outer peripheral shape of such at least one twisted electrical wire during the generation of such at least one longitudinal cut.

Even further, it provides such a system wherein: such at least one shape conforming guide comprises at least one shaped channel adapted to pass the at least one twisted electrical wire; and such at least one shaped channel comprises such at least one cutter. Moreover, it provides such a system wherein such at least one wire comprises at least two twisted conductors.

BRIEF DESCRIPTION OF THE DRAWINGS

FIG. 1 shows a perspective view illustrating a twisted shielded wire of the type used in aircraft electrical systems.

FIG. 2 shows a perspective view of a wire stripping tool of a wire stripper system according to a preferred embodiment of the present invention.

FIG. 3B shows a partial exploded view of a forward cutting assembly of the wire stripping tool according to the preferred embodiment of FIG. 2.

FIG. 3C shows a partially assembled exploded view of the forward cutting assembly of FIG. 3B.

FIG. 4A shows a sectional view through the section 4A—4A of FIG. 2, illustrating the wire stripping tool in an open position, according to the preferred embodiment of FIG. 2.

FIG. 4B shows a detailed sectional view through the section 4B—4B of FIG. 2, illustrating the wire stripping tool in an open position, according to the preferred embodiment of FIG. 2.

FIG. 4C shows a perspective view of a pivoting armature, isolated from the wire stripping tool for clarity, illustrating a preferred mechanical operation of the preferred embodiment of FIG. 2.

FIG. 6 shows a detail sectional view 6—6 of FIG. 5, illustrating the wire stripper system in a closed position.

FIG. 7A shows a front perspective view of a cutting die set, according to the preferred embodiment of FIG. 2.

FIG. 7B shows a rear perspective view of a cutting die set, according to the preferred embodiment of FIG. 2.

FIG. 8 shows a front perspective view of a cutting die set, in an operable cutting position, according to the preferred embodiment of FIG. 2.

FIG. 9 shows a front view of a preferred cutting die half portion, according to the preferred embodiment of FIG. 2.

FIG. 10 shows a top view of a preferred cutting die half portion, according to the preferred embodiment of FIG. 2.

FIG. 11 shows a rear view of a preferred cutting die half portion, according to the preferred embodiment of FIG. 2.

FIG. 12 shows a side view of a preferred cutting die half portion, according to the preferred embodiment of FIG. 2.

FIG. 13 shows a front view of preferred cutting blade positioning within the cutting die set, according to the preferred embodiment of FIG. 2.

DETAILED DESCRIPTION OF THE BEST MODES AND PREFERRED EMBODIMENTS OF THE INVENTION

FIG. 1 shows a perspective view illustrating twisted shielded wire 101 of the type used in aircraft electrical systems. Twisted shielded wire 101 comprises a non-uniformly shaped outer jacket 103, as shown. Outer jacket 103 may be manufactured from a Teflon-containing material (Tefzel), or similar material, and is adapted to protectively cover underlying braided shield 105 and insulated conductors 107, as shown. Twisted shielded wire 101 displays the inherent helical (spiral) outer contour common in twisted shielded pair wire.

Figure 3A:
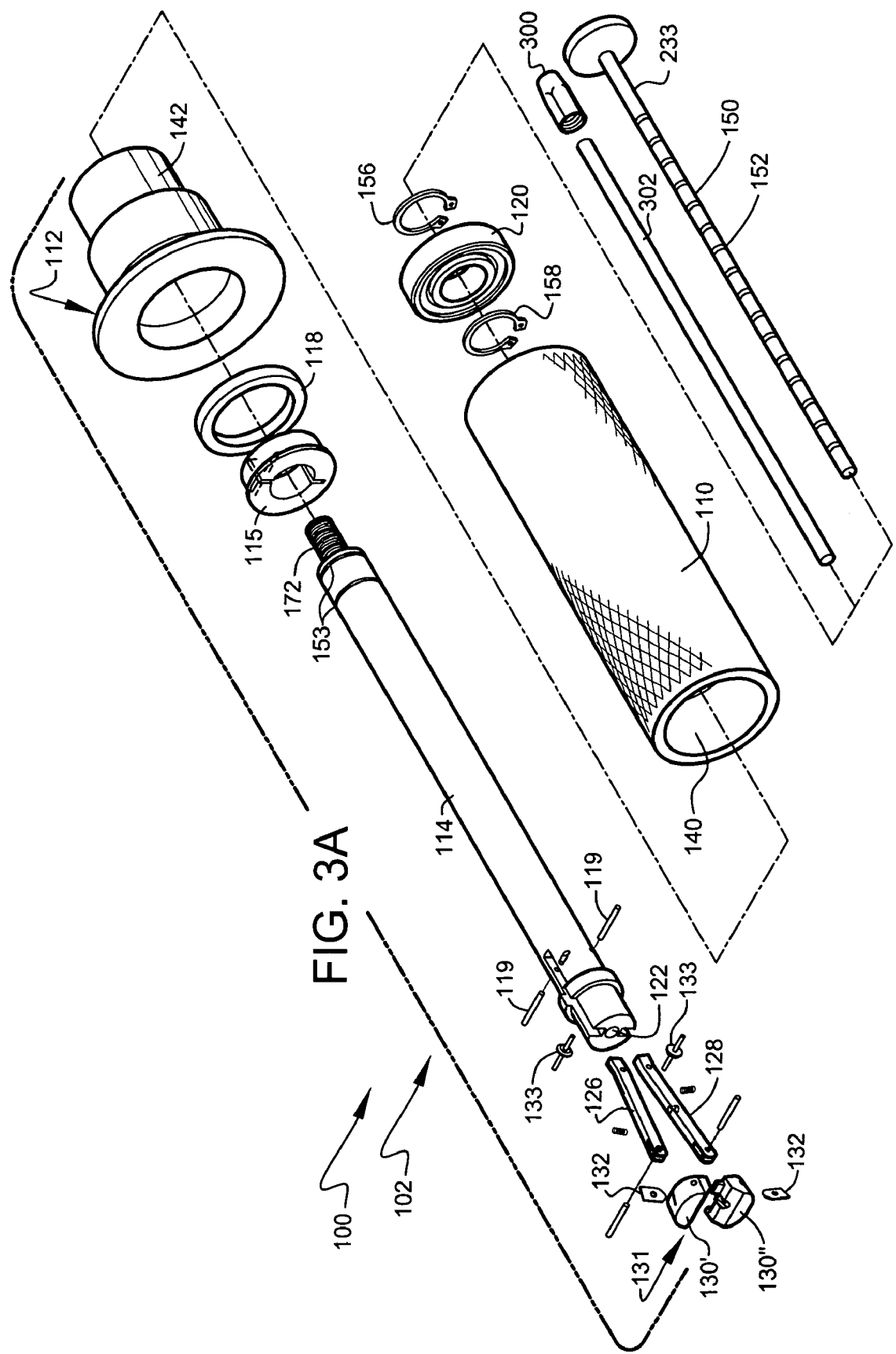
FIG. 3A shows an exploded view of the wire stripping tool according to the preferred embodiment of FIG. 2.

FIG. 2 shows a perspective view of wire stripping tool 102 of wire stripper system 100 according to a preferred embodiment of the present invention. FIG. 3A shows an exploded view of wire stripping tool 102 according to the preferred embodiment of FIG. 2. FIG. 3B shows a partial exploded view of forward rotating cutting assembly 104 of wire stripping tool 102 according to the preferred embodiment of FIG. 2. Reference is now made to FIG. 2 through FIG. 3B, with continued reference to FIG. 1.

Preferably, wire stripping tool 102 is adapted to make two longitudinal slits on opposing sides of outer jacket 103 of twisted shielded wire 101 of FIG. 1. Preferably, wire stripping tool 102 produces quick, uniform, and depth-accurate scoring of outer jacket 103 thus assisting the removal of unwanted portions of outer jacket 103, from the twisted wire, while leaving the underlying braided shield 105 substantially intact. The illustrated embodiment of FIG. 2 is preferably adapted to the specific task of stripping the outer jacket twisted-pair wire. Upon reading the teachings of this specification, those with ordinary skill in the art will now understand that, under appropriate circumstances, considering issues such as intended use, trends in aviation electronics, etc., other stripper arrangements, such as, for example, arrangements to strip twisted wire comprising three or more conductors, a single conductor, etc., may suffice.

Preferably, wire stripping tool 102 is sized and arranged to operate as a hand-held tool, as shown. Preferred dimensions of the example wire stripping tool 102 are presented in FIG. 14, below.

Preferably, wire stripping tool 102 comprises handgrip 110, thumb actuator 112, and rotating shaft 114, as shown. Preferably, handgrip 110 (at least embodying herein grip means for assisting user griping of such receiver means) comprises a hollow, essentially cylindrical, member, symmetrically configured about longitudinal axis 116, as shown. Preferably, handgrip 110 comprises an internal bore 140 adapted to receive a concentrically positioned, complementary-shaped, extension 142 of thumb actuator 112, as shown. Preferably, internal bore 140 and extension 142 each comprise an essentially circular cross section. In addition, handgrip 110 of wire stripping tool 102 further comprises a grip assisting finish, preferably a pattern of diamond knurling, applied to assist the user in maintaining a hand-held grip during use.

Preferably, thumb actuator 112 (at least embodying herein manual actuator means) is adapted to move independently of handgrip 110. Preferably, thumb actuator 112 is adapted to move forward and back along a line essentially parallel to longitudinal axis 116, as described below.

Preferably, rotating shaft 114 (at least embodying herein at least one rotator adapted to assist rotation of such at least one receiver relative to the at least one wire) is situated coaxially along longitudinal axis 116, as shown. Upon reading the teachings of this specification, those with ordinary skill in the art will now understand that, under appropriate circumstances, considering issues such as intended use, etc., other tool arrangements, such as, for example, combining a wire stripper with a bench mounted fixture, etc., may suffice.

Preferably, the forward end of rotating shaft 114 comprises cutting assembly 124, as shown (at least embodying herein at least one positioner adapted to position such at least one cutter adjacent the at least one outer jacket to assist in generating such at least one longitudinal cut). Preferably, cutting die set 131 of cutting assembly 124 is free to rotate with rotating shaft 114 (at least embodying herein at least one rotator adapted to assist rotation of such at least one receiver relative to the at least one wire; wherein such at least one first cutter and such at least one second cutter rotate with such at least one receiver during operation), allowing a specially positioned set of cutting blades 132 to track along the spiraled outer shape of the wire, producing two longitudinal cuts within outer jacket 103. Preferably, rotating shaft 114 is supported within at least one, preferably two low-friction bearings, each adapted to rotationally support rotating shaft 114 within wire stripping tool 102. Preferably, the forward end of rotating shaft 114 is engaged in front bearing 118, with the trailing end of rotating shaft 114 preferably supported within rear bearing 120, as shown. Preferably, front bearing 118 (at least embodying herein at least one first rotatable bearing) is engaged within a modified bearing cage 115 recessed within thumb actuator 112, as shown. Preferably, rear bearing 120 is recessed within the distal end of handgrip 110, as shown. Preferably, both front bearing 118 and rear bearing 120 are adapted to allow rotating shaft 114 to freely rotate within thumb actuator 112 and handgrip 110 during use. Preferably, front bearing 118 comprises a thin-section bearing, as shown. Bearings preferably suitable for use as rear bearing 120 are model 7Y55-PSS11250 available through Stock Drive Products/Sterling Instrument (SDP-SI) of New Hyde Park, N.Y. Thin section bearings suitable for use as front bearing 118 are available from National Precision Bearing, Inc. of Preston, Wash.

Preferably, rotating shaft 114 (at least embodying herein receiver means for receiving at least one portion of the at least one twisted wire) comprises a generally cylindrical rod having a circular interior channel 122 that is preferably adapted to receive a length of twisted shielded wire 101 (at least embodying herein at least one tubular member comprising at least one longitudinal axis and at least one hollow interior portion coaxial with such at least one longitudinal axis).

Preferably, rotating shaft 114 is adapted to receive the operable components of cutting assembly 124 (at least embodying herein positioner means for positioning of such first cutter means and such second cutter means adjacent the at least one outer jacket to allow such at least one first longitudinal cut and such at least one second longitudinal cut), as shown.

Preferably, cutting assembly 124 comprises first armature 126 and second armature 128, as shown. Preferably, the proximal ends of first armature 126 and second armature 128 are pivotally fixed to rotating shaft 114 (as best illustrated in FIG. 3C). Preferably, the proximal ends of first armature 126 and second armature 128 are pivotally fixed to rotating shaft 114 using a set of retaining pins 119, as shown. Preferably, the distal ends of first armature 126 and second armature 128 support the cutting die set 131, discussed above. More specifically, the distal ends of first armature 126 and second armature 128 each preferably comprise a cutting die half portion 130, as shown. Preferably, the two cutting die half portions 130 combine to form cutting die set 131 (at least embodying herein at least one receiver adapted to receive at least one portion of the at least one wire).

Preferably, each cutting die half portion 130 comprises a cutting blade 132, preferably adapted to pierce outer jacket 103 (the outer protective case) of twisted shielded wire 101. Preferably, each cutting die half portion 130 comprises a symmetrical mounting configuration allowing the same die to be installed on first armature 126 or second armature 128 (in an inverted position), as shown, (at least embodying herein wherein such first cutter means is useable as such second cutter means and such second cutter means is usable as such first cutter means). Upon reading the teachings of this specification, those of ordinary skill in the art will now understand that, under appropriate circumstances, considering such issues as intended use, cost, etc., other blade arrangements, such as, for example, double-sided blades, reversible blades, etc., may suffice. Furthermore, upon reading the teachings of this specification, those with ordinary skill in the art will now understand that, under appropriate circumstances, considering issues such as intended use, cost, etc., other armature-die arrangements, such as, for example, using three or more armature-die assemblies, using a single articulated armature in conjunction with a fixed arm arrangement, etc., may suffice.

Preferably, the distal end of each armature divides to form a pair of aperture-containing projections 121, as shown. Preferably, the rear face of each cutting die half portion 130 comprises a pair of sockets 123 (see FIG. 7B) adapted to receive projections 121. Preferably, cutting die half portions 130 are firmly retained on their respective armature using a retaining pin 125, as shown. Preferably, first armature 126 and second armature 128 are adapted to allow user removal and replacement of cutting die half portions 130 to renew the cutting blades contained therein. Preferably, retaining pin 125 comprises a roll-type pin adapted to be field serviceable (at least embodying herein, wherein such at least one first cutter and such at least one second cutter each comprise at least one removable coupler to assist removable coupling with such at least one receiver).

Although cutting die half portions 130 are preferably identical, for clarity in the subsequent discussions, cutting die half portion 130 mounted to first armature 126 shall hereinafter be identified as cutting die half portion 130' (at least embodying herein at least one first cutter adapted to produce at least one first longitudinal cut through the at least one outer jacket) and the cutting die mounted to second armature 128 shall hereinafter be identified as cutting die half portion 130" (at least embodying herein at least one second cutter adapted to produce at least one second longitudinal cut through the at least one outer jacket).

Preferably, the forward end of rotating shaft 114 comprises a pair of opposing longitudinal slots identified herein as first slot receiver 146 and second slot receiver 148, as shown. Preferably, first slot receiver 146 is adapted to receive first armature 126, and second slot receiver 148 is adapted to receive second armature 128, as shown. Preferably, first slot receiver 146 and second slot receiver 148 are each adapted to contain one of the armatures during cutting, as described below.

FIG. 3C shows an exploded view of a partially assembled forward cutting assembly 124. In the illustration of FIG. 3C, first armature 126 and second armature 128 have been mounted to rotating shaft 114, as shown. For clarity, in FIG. 3C, the forward end of rotating shaft 114 has been pulled away from bearing cage 115, as shown. Preferably, bearing cage comprises inner bore 127, as shown. Preferably, the inner diameter of inner bore 127 is sized slightly larger than the outer diameter of rotating shaft 114. This preferred arrangement allows substantially free movement of bearing cage 115 along rotating shaft 114, as shown (at least embodying herein wherein such at least one first rotatable bearing is movable relative to such at least one tubular member).

Preferably, first slot receiver 146 and second slot receiver 148 are preferably sized to allow first armature 126 and second armature 128 to retract substantially flush with the outer circumferential face of rotating shaft 114 as bearing cage 115 is moved toward actuator stop 162. Preferably, actuator stop 162 functions to limit the forward travel (toward the cutting die) of bearing cage 115 (and thumb actuator 112) relative to rotating shaft 114. Preferably, actuator stop 162 comprises at least one, preferably two collar segments situated circumferentially around opposing sides of rotating shaft 114, as shown. Specifically, actuator stop 162 limits forward movement of bearing cage 115 to prevent it from contacting the cutting die. Preferably, actuator stop 162 is integrally formed with rotating shaft 114, as shown. Upon reading the teachings of this specification, those with ordinary skill in the art will now understand that, under appropriate circumstances, considering issues such as cost, intended use, etc., other stopping arrangements, such as, for example, screw posts, adjustable collars, terminating channels, etc., may suffice.

FIG. 4A shows a sectional view through the section 4A—4A of FIG. 2 illustrating wire stripping tool 102 in an open position, according to the preferred embodiment of FIG. 2. FIG. 4B shows a detailed sectional view through the section 4B—4B of FIG. 2 also illustrating the wire stripping tool in an open position. FIG. 4C shows a perspective view of first armature 126, isolated from the wire stripping tool 102 for clarity, illustrating a preferred mechanical operation of the preferred embodiment of FIG. 2. Reference is now made to FIG. 3C through FIG. 4C, with continued reference to FIG. 1 and FIG. 2.

Preferably, first armature 126 and second armature 128 are biased to maintain a generally open position by spring 136 and spring 138, respectively, as shown. Preferably, spring 136 and spring 138 are positioned within receiving sockets formed within armature 126 and second armature 128, as shown. Springs suitable for use as spring 136 and spring 138 include model S78CSY-005006031 available through Stock Drive Products/Sterling Instrument (SDP-SI) of New Hyde Park, N.Y.

Most preferably, first armature 126 and second armature 128 are each biased to a generally open position by the "V"-shape profile of the armatures, as described below. Preferably, the upper and lower faces of first armature 126 and second armature 128 comprise guide slots 129, as shown. Preferably, each guide slot 129 is adapted to accept the circumferential rolling edge of one of a pair of rolling wheels 133 mounted within bearing cage 115, as shown. Wheels 133 (at least embodying herein at least one first friction reducer adapted to reduce friction between such at least one manual actuator and such at least one first pivot member; and at least one second friction reducer adapted to reduce friction between such at least one manual actuator and such at least one second pivot member) preferably function to reduce friction between components as bearing cage 115 is moved toward actuator stop 162. Preferably, each wheel 133 is retained within a transverse slot 137 formed within inner bore of 127 of bearing cage 115, as shown. Preferably, axles 135 extend through bearing cage 115 to support wheels 133 within the slots, as shown. Preferably, the distance between axles 135 is fixed, as shown.

Preferably, manual movement of thumb actuator 112 toward cutting assembly 124 (relative to handgrip 110) urges bearing cage 115 toward actuator stop 162. This preferably drives wheels 133 forward within each respective guide slot 129, as best illustrated in FIG. 4C. Recalling that the distance between axles 135 is fixed, moving the assembly of bearing cage 115 and wheels 133 forward preferably pivots armature 126 and second armature 128 toward longitudinal axis 116, as shown. The arrow depiction of FIG. 4C generally indicates the preferred linear movement of wheels 133, and pivotal movement of armature 126 and second armature 128. This action preferably rotates cutting die half portion 130' into contact with cutting die half portion 130", as illustrated in FIG. 5 (at least embodying herein at least one manual actuator adapted to assist manual actuation of such at least one first pivot member and such at least one second pivot member).

Preferably, manual movement of thumb actuator 112 away from cutting assembly 124 (relative to handgrip 110) drives wheels 133 rearward within each respective guide slot 129 to engage a raised end portion 159 of each armature, as shown. Preferably, raised end portion 159 is located across the pivot axis of retaining pins 119, as shown. This preferred arrangement results in the outward rotation of first armature 126 and second armature 128, away from longitudinal axis 116. This highly arrangement is most preferred as it eliminates the need for spring 136 and spring 138 within the assembly.

Figure 5:
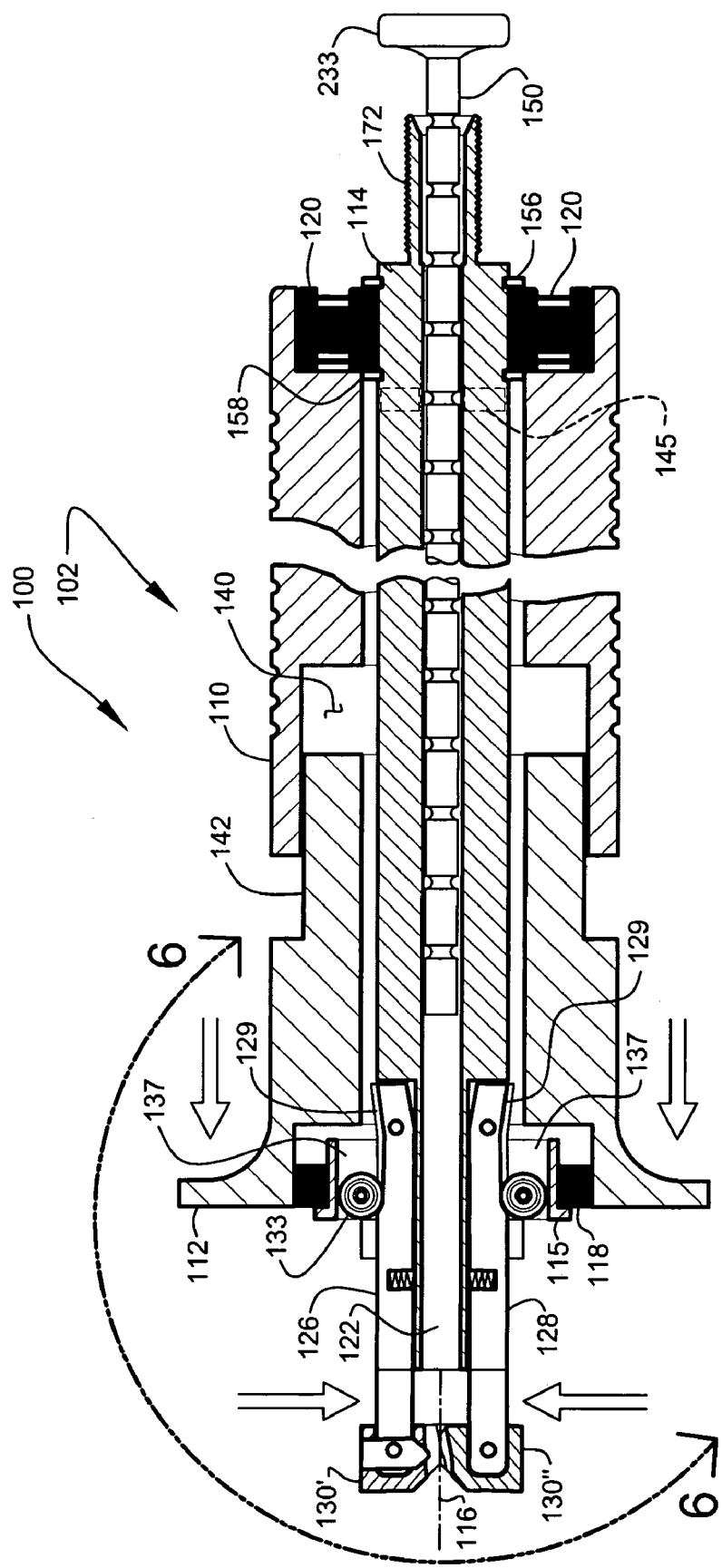
FIG. 5 shows a sectional view of the section 4A—4A of FIG. 2 illustrating the wire stripping tool in a closed position.

FIG. 5 shows a sectional view of the section 4A—4A of FIG. 2 illustrating wire stripping tool 102 in a closed position. FIG. 6 shows a detail sectional view 6—6 of FIG. 5 illustrating the wire stripper system in the closed (locked) position of FIG. 5. In preferred use, a length of twisted shielded wire 101 (shown in dashed line depiction) is inserted into the cutting-assembly end of interior channel 122, as shown. Preferably, wire stripping tool 102 incorporates cut length gauge 233 to allow repetitive removal of the same length jacket from multiple wires (an alternate preferred cut-length arrangement is also presented below).

Preferably, cut length gauge 233 (at least embodying herein at least one cut length gauge adapted to gauge at least one length of at least one of such at least one first longitudinal cut and such at least one second longitudinal cut) is adjusted by gripping exposed end to allow a sliding manipulation of the gauge shaft 150 within interior channel 122. Preferably, gauge shaft 150 of cut length gauge 233 comprises a series of calibrated indents 152, adapted to adjustably position cut length gauge 233 within wire stripping tool 102, thus assisting the user in setting a specific cut length. Preferably, interior channel 122 comprises at least one, preferably a pair of ball-nose spring plungers 145, functioning as detents to engage calibrated indents, thus holding cut length gauge 233 in a selected position. Ball-nose spring plungers suitable for use as ball-nose spring plungers 145 are model 3408A88 available through of McMaster-Carr of Atlanta, Ga. Preferably, ball-nose spring plungers 145 are disposed within a threaded passage, extending through rotating shaft 114, essentially perpendicular to longitudinal axis 116. It should be noted that ball-nose spring plungers 145 are not used within wire stripping tool 102 when an alternate collet assembly is preferably used, as described below.

Preferably, once twisted shielded wire 101 is positioned within wire stripping tool 102; cutting die half portion 130' and cutting die half portion 130" are clamped (locked) onto twisted shielded wire 101 by sliding thumb actuator 112 towards actuator stop 162. Preferably, as thumb actuator 112 is directed forward, armature 126 and second armature 128 are urged into first slot receiver 146 and second slot receiver 148 by the constriction imposed by wheels 133 of bearing cage 115. Preferably, both cutter dies are rotated to pierce outer jacket 103 (the outer protective case shown in FIG. 1) while leaving the immediate-inner-layer braided shield intact. Preferably, after cutting die half portion 130' and cutting die half portion 130" are locked onto twisted shielded wire 101, wire stripping tool 102 is pulled along twisted shielded wire 101, making two simultaneous longitudinal cuts within the outer jacket (at least embodying herein wherein such at least one first cutter and such at least one second cutter operate essentially contemporaneously). The preferred novel arrangements of wire stripping tool 102 allow cutting assembly 124 to rotationally follow the spiral contour of twisted shielded wire 101 as wire stripping tool 102 is pulled from the point of cutter engagement to the end of the wire.

Preferably, bringing cutting die half portion 130' and cutting die half portion 130" together forms a shaped aperture identified herein as wire channel 160 (as best shown in FIG. 6). Preferably, wire channel 160 is non-circular, as shown. Preferably, wire channel 160 (at least embodying herein at least one shape conformer adapted to conform to the at least one irregular outer peripheral shape of such at least one wire during the generation of such at least one longitudinal cut and at least embodying herein at least one channel and at least one shaped channel) comprises a shape substantially matching the transverse cross sectional shape of twisted shielded wire 101, as best illustrated in the detail inset of FIG. 6. Although twisted shielded wire 101 comprises a non-uniform (twisting) peripheral shape along the longitudinal length, twisted shielded wire 101 generally comprises a relatively uniform peripheral shape in transverse cross section. Preferably, the elongated shape of wire channel 160 in contact with outer jacket 103, in combination with the free rotation of cutting assembly 124, preferably functions to guide cutting assembly 124 along twisted shielded wire 101 by continuously maintaining the same relative relationship of wire channel 160 (and cutting blades 132) to the relatively uniform transverse cross sectional shape of twisted shielded wire 101.

Most preferably, the interior shape of wire channel 160 is substantially similar, substantially along its length, to the twisted outer shape of twisted shielded wire 101, as shown in FIG. 6 and the top view of FIG. 10 (at least embodying herein wherein such at least one shape conformer comprises at least one irregular inner peripheral shape within such at least one channel; and such at least one irregular inner peripheral shape substantially matches such at least one irregular outer peripheral shape and at least embodying herein at least one shape conforming guide).

The novel shape of wire channel 160 preferably allows a consistent rotational tracking of cutting assembly 124 as it rotates along the spiraling outer jacket 103 of twisted shielded wire 101 during cutting operations. The preferred shape of wire channel 160 produces continuous cuts of consistent depth.

Preferably, cutting die set 131 can be size and shape adapted for specific types of multiple shielded inner wire constructions including those identified herein. Upon reading the teachings of this specification, those with ordinary skill in the art will now understand that, under appropriate circumstances, considering issues such as intended use, new and emerging wire design, etc., other aperture arrangements, such as, for example, circular apertures, multiple apertures, apertures comprising other regular polygonal shapes, wire-specific aperture shapes, etc., may suffice.

FIG. 7A shows a front perspective view of cutting die set 131, according to the preferred embodiment of FIG. 2. FIG. 7B shows a rear perspective view of cutting die set 131, preferably comprising cutting die half portion 130' and cutting die half portion 130", as shown.

Preferably, cutting die half portion 130' and cutting die half portion 130" are identical in physical shape. This modular arrangement preferably allows installation of cutting die half portion 130' and cutting die half portion 130" on either first armature 126 or second armature 128.

Preferably, cutting die half portion 130 (comprising cutting die half portion 130' and cutting die half portion 130") comprises tab 175 and socket 176, as shown (at least embodying herein at least one lateral positioner adapted to laterally position such at least one first cutting die relative to such at least one second cutting die during use). Preferably, each tab 175 functions to guide twisted shielded pair wire 101 to the correct position within wire channel 160 as die half portion 130' and cutting die half portion 130" are moved together. In addition, tab 175 and socket 176 preferably function to positionally interlock and laterally support cutting die half portion 130' and cutting die half portion 130" during use. FIG. 8 shows a front perspective view of cutting die set 131, in an operable cutting position, according to the preferred embodiment of FIG. 2. Preferably, when tab 175 and socket 176 are inter-engaged, cutting die 131 operates as a substantially unitary element. Preferably, cutting die half portions 130 are molded from at least one rigid plastic, with glass-filled nylon being preferred.

FIG. 9 shows a front view of a preferred cutting die half portion 130, according to the preferred embodiment of FIG. 2. FIG. 10 shows a top view of a preferred cutting die half portion 130, according to the preferred embodiment of FIG. 2. FIG. 11 shows a rear view of a preferred cutting die half portion 130, according to the preferred embodiment of FIG. 2. FIG. 12 shows a side view of a preferred cutting die half portion 130, according to the preferred embodiment of FIG. 2.

In preferred embodiments of cutting die half portion 130, cutting blade 132 is permanently bonded within cutting die half portion 130. In this arrangement, cutting die half portion 130 preferably comprises a disposable, re-orderable part. In alternate preferred embodiments of cutting die half portion 130, cutting blade 132 is removable from cutting die half portion 130. In this preferred arrangement, cutting blade 132 alone comprises a disposable, re-orderable part. Upon reading the teachings of this specification, those with ordinary skill in the art will now understand that, under appropriate circumstances, considering issues such as designer preference, intended use etc., other die arrangements, such as, for example, using permanently affixed dies having removable blades, molding the armatures and dies as a single member, molding the blades within the dies, etc., may suffice.

Preferably, cutting die half portion 130 comprises a transverse aperture 147 adapted to receive retaining pin 125, as shown. Preferably, cutting blade 132 comprises a matched aperture to allow the passage retaining pin 125, as shown. Preferably, retaining pin 125 functions to assist in securing cutting die half portion 130 to its respective armature, and to fix cutting blade 132 within cutting die half portion 130, as shown. Upon reading the teachings of this specification, those with ordinary skill in the art will now understand that, under appropriate circumstances, considering issues such as cost, intended use, etc., other cutting blade arrangements, such as, for example, providing a cutting blade at a single die-half only, providing multiple cutting blades in each die-half, using heat methods of cutting, etc., may suffice.

FIG. 13 shows a front view of preferred positioning of cutting blades 132 within cutting die set 131, according to the preferred embodiment of FIG. 2. Preferably, each cutting blade 132 is rotated within the die to better position the cutting face relative to the face of outer jacket 103, as shown. Angling cutting blades 132 promotes the preferred spiral cut within outer jacket 103. Preferably, each cutting blade 132 is rotated about 12 to 13 degrees relative to longitudinal axis 116, as shown.

Figure 14:
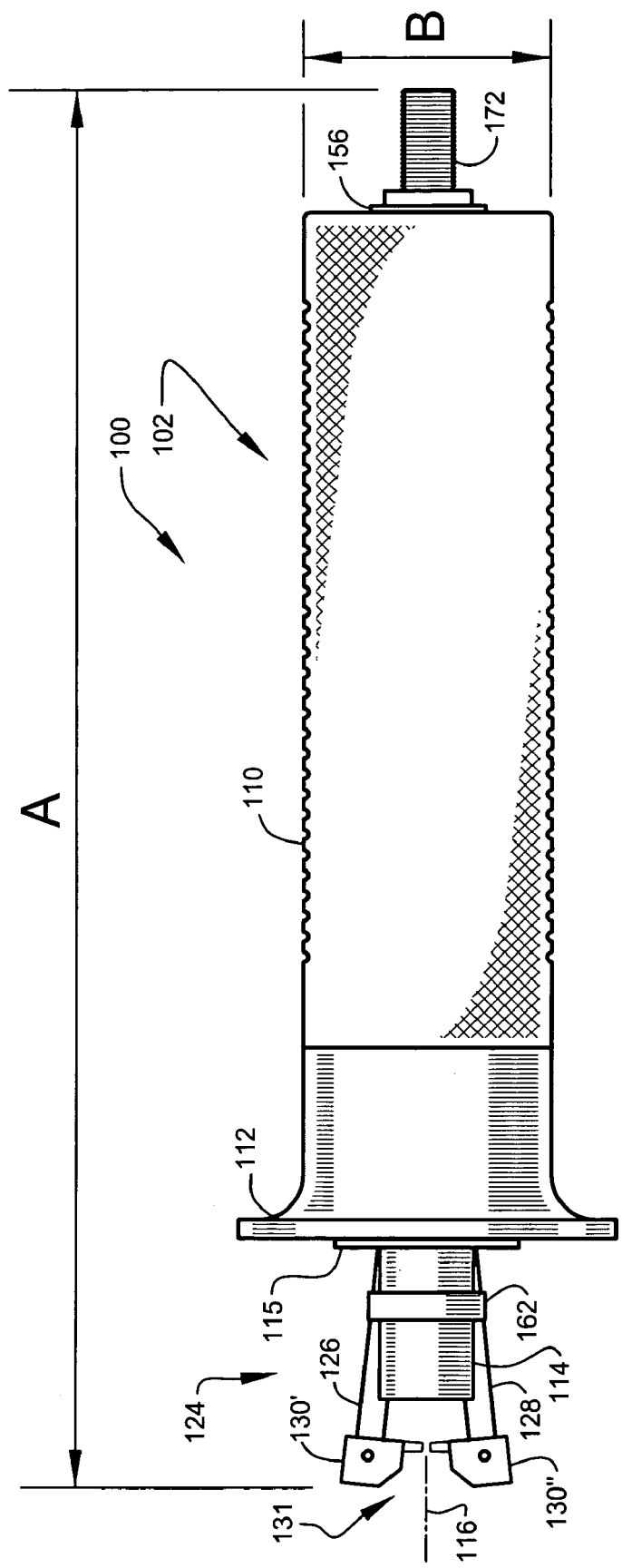
FIG. 14 shows a side view of the wire stripping tool, according to the preferred embodiment of FIG. 2.

FIG. 14 shows a side view of wire stripping tool 102, according to the preferred embodiment of FIG. 2. Preferably, wire stripping tool 102 comprises an overall length "A" of about 190 millimeters, with a handgrip diameter "B" of between about 30 millimeters to about 35 millimeters (at least embodying herein at least one hand-holdable housing adapted to house such at least one rotator and such at least one receiver). Preferably, rotating shaft 114 comprises an outer diameter of about 12 to 13 millimeters. Preferably, interior channel 122 comprises an inner diameter of about 3 to 4 millimeters. Alternate preferred dimensions are dependent on the size and nature of twisted wire to be stripped. Upon reading the teachings of this specification, those of ordinary skill in the art will now understand that, under appropriate circumstances, considering such issues as intended use, cost, etc., other system arrangements, such as, for example, using interchangeable rotating shafts and cutting dies to accommodate several wire thicknesses, etc., may suffice.

Preferably, handgrip 110, thumb actuator 112, and rotating shaft 114 are constructed of metal, preferably aluminum. Preferably, both first armature 126 and second armature 128 are constructed from metal, preferably stainless steel. Upon reading the teachings of this specification, those with ordinary skill in the art will now understand that, under appropriate circumstances, considering issues such as cost, etc., other material selections, such as, for example, rigid plastics, metals, ceramics, epoxies, composites, etc., may suffice.

In the following discussion, it is helpful to again refer to the exploded view of FIG. 3A. Preferably, rotating shaft 114 comprises a pair of circumferential slots 153 adapted to receive a pair of retaining rings, retaining ring 156 and retaining ring 158, as best illustrated in FIG. 5. Preferably, circumferential slots 123 are situated such that a single retaining ring is positioned closely adjacent to each side of rear bearing 120, as shown. Preferably, the above-described arrangement of the retaining rings prevents essentially all linear movement of rotating shaft 114 along longitudinal axis 116. Preferably, retaining ring 156 is removable to assist assembly/disassembly of wire stripping tool 102. Retaining rings preferably suitable for use as retaining ring 156 and retaining ring 158 are model S73HW2-100-050 available through of McMaster-Carr of Atlanta, Ga.

Preferably, wire stripping tool 102 comprises a highly preferred alternate arrangement for setting the strip length of the twisted shielded wire 101. Preferably, rotating shaft 114 of wire stripping tool 102 comprises threaded end 172, as shown. Preferably, threaded end 172 is adapted to receive threaded collet nut 300, to allow adjustable retention of cut-length rod 302 within interior channel 122, as best shown in FIG. 3A. Preferably, the cut-length rod is used to gauge the length of twisted shielded wire 101 to be stripped. A preferred collet nut 300 comprises commercially available units such as is presently used for high-speed rotary tools, for example a Dremel brand rotary tool. A collet nut 300 accepting a smooth rod having an outer diameter closely matching the interior diameter of interior channel 122 (preferably a ⅛-inch diameter drill-rod) is presently preferred.

In preferred use, the collet assembly (at least embodying herein at least one cut length gauge adapted to gauge at least one length of at least one of such at least one first longitudinal cut and such at least one second longitudinal cut) is mounted to threaded end 172, and gauging rod 302 is inserted into the end of rotating shaft 114, to a selected point, leaving room for a length of wire to be inserted in the opposite end of rotating shaft 114. Preferably, tightening of a collet nut 300 compresses an internal collet sleeve against the rod thereby restraining rod movement relative to rotating shaft 114. Upon reading the teachings of this specification, those with ordinary skill in the art will now understand that, under appropriate circumstances, considering issues such as cost, etc., other rod restraining arrangements, such as, for example, cam-based clamping devices, externally threaded rods, friction systems, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification.

Further, many other advantages of applicant's invention will be apparent to those skilled in the art from the above descriptions and the below claims.

What is claimed is:

1. A system, relating to the stripping of at least one outer jacket from at least one wire having at least one irregular outer peripheral shape, comprising:
    a) at least one receiver adapted to receive at least one portion of the at least one wire;
    b) at least one rotator adapted to assist rotation of said at least one receiver relative to the at least one wire; and
    c) at least one hand-holdable housing adapted to house said at least one rotator and said at least one receiver;
    d) wherein said at least one receiver comprises
        i) at least one first cutter adapted to produce at least one first longitudinal cut through the at least one outer jacket,
        ii) at least one second cutter adapted to produce at least one second longitudinal cut through the at least one outer jacket, and
        iii) at least one positioner adapted to position said at least one first cutter and said at least one second cutter adjacent the at least one outer jacket to assist in generating such at least one first longitudinal cut and such at least one second longitudinal cut;
    e) wherein said at least one positioner comprises, coupled to said at least one receiver, at least one first pivot member adapted to pivotally engage said at least one first cutter with the at least one outer jacket;
    f) wherein said at least one positioner comprises, coupled to said at least one receiver, at least one second pivot member adapted to pivotally engage said at least one second cutter with the at least one outer jacket;
    g) wherein said at least one positioner comprises at least one manual actuator adapted to assist manual actuation of said at least one first pivot member and said at least one second pivot member;
    h) wherein said at least one first cutter comprises at least one first cutting die adapted to engage at least one first portion of the at least one outer jacket;

i) wherein said at least one second cutter comprises at least one second cutting die adapted to engage at least one second portion of the at least one outer jacket; and
j) wherein said at least one first cutting die and said at least one second cutting die each comprise at least one cutting blade.

2. The system according to claim 1 wherein:
a) said at least one first cutting die and said at least one second cutting die together comprise at least one shaped channel adapted to pass the at least one wire;
b) said at least one shaped channel comprises at least one irregular inner peripheral shape; and
c) said at least one irregular inner peripheral shape substantially matches such at least one irregular outer peripheral shape of the at least one wire.

3. The system according to claim 1 wherein said at least one first cutting die and said at least one second cutting die are substantially identical.

4. The system according to claim 1 further comprising at least one lateral positioner adapted to laterally position said at least one first cutting die relative to said at least one second cutting die during use.

5. The system according to claim 4 wherein:
a) said at least one lateral positioner comprises at least one projecting tab and at least one recessed socket;
b) said at least one projecting tab is adapted to engage said at least one recessed socket; and
c) each one of said at least one first cutting die and said at least one second cutting die comprise said at least one projecting tab and said at least one recessed socket.

6. The system according to claim 1 wherein:
a) each said at least one cutting blade is permanently embedded within a respective said at least one first cutting die and said at least one second cutting die.

7. The system according to claim 1 wherein:
a) said at least one receiver comprises at least one tubular member comprising at least one longitudinal axis and at least one hollow interior portion coaxial with said at least one longitudinal axis;
b) said at least one hollow interior portion is adapted to accommodate the at least one portion of the at least one wire;
c) said at least one rotator comprises at least one first rotatable bearing adapted to rotationally support said at least one tubular member and at least one second rotatable bearing adapted to rotationally support said at least one tubular member; and
d) said at least one first rotatable bearing is movable relative to said at least one tubular member.

8. The system according to claim 7 wherein said at least one manual actuator comprises said at least one first rotatable bearing.

9. The system according to claim 8 wherein said at least one first rotatable bearing comprises:
a) at least one first friction reducer adapted to reduce friction between said at least one manual actuator and said at least one first pivot member; and
b) at least one second friction reducer adapted to reduce friction between said at least one manual actuator and said at least one second pivot member.

10. The system according to claim 8 wherein said system further comprises:
a) at least one cut length gauge comprises
   i) at least one rod adapted to adapted to gauge at least one length of at least one of such at least one first longitudinal cut and such at least one second longitudinal cut,
   ii) at least one collet nut adapted to adjustably retain said at least one rod within said at least one hollow interior portion;
b) wherein said at least one tubular member comprises at least one threaded end adapted to threadably receive said at least one collet nut.

* * * * *